(12) United States Patent
Han

(10) Patent No.: US 11,592,823 B2
(45) Date of Patent: Feb. 28, 2023

(54) ROBOT CLEANER AND METHOD FOR CONTROLLING THE CLEANER

(71) Applicant: LG ELECTRONICS INC., Seoul (KR)

(72) Inventor: Jinwoo Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 225 days.

(21) Appl. No.: 16/675,715

(22) Filed: Nov. 6, 2019

(65) Prior Publication Data

US 2021/0055736 A1 Feb. 25, 2021

(30) Foreign Application Priority Data

Aug. 23, 2019 (KR) ........................ 10-2019-0103524

(51) Int. Cl.
*G05D 1/02* (2020.01)

(52) U.S. Cl.
CPC ......... *G05D 1/0217* (2013.01); *G05D 1/0219* (2013.01); *G05D 1/0225* (2013.01);
(Continued)

(58) Field of Classification Search
CPC .............. G05D 1/0217; G05D 1/0219; G05D 1/0225; G05D 2201/0203; G05D 1/0274;
(Continued)

(56) References Cited

U.S. PATENT DOCUMENTS 9,215,957 B2 12/2015 Cohen et al.
10,518,407 B2 * 12/2019 Williams ................... B25J 9/08
(Continued)

FOREIGN PATENT DOCUMENTS

JP 2002-318620 10/2002
JP 2006-107168 4/2006
(Continued)

OTHER PUBLICATIONS

International Search Report dated Jun. 22, 2020 issued in International Application No. PCT/KR2019/013210.
(Continued)

*Primary Examiner* — Khoi H Tran
*Assistant Examiner* — Nhi Q Bui
(74) *Attorney, Agent, or Firm* — Ked & Associates, LLP

(57) ABSTRACT

Provided is a method for controlling a robot cleaner, the method comprising: a preparatory step of dividing a cleaning target area input by an user into a plurality of to-be-cleaned regions and identifying a battery consumption required for cleaning each region; a determination step of determining whether the robot cleaner requires additional charging to clean the cleaning target area based on a current battery residual amount of the robot cleaner; upon determination that the additional charging is required, a selection step for selecting a first region, wherein the first region is defined as one combination selected from combinations of to-be-cleaned regions among the plurality of to-be-cleaned regions which are determined to be able to be cleaned using the current battery residual amount of the robot cleaner; and a first cleaning step of cleaning the first region.

17 Claims, 11 Drawing Sheets

(52) U.S. Cl.
 CPC ..... *A47L 2201/022* (2013.01); *A47L 2201/04* (2013.01); *G05D 2201/0203* (2013.01)

(58) Field of Classification Search
 CPC ............ G05D 2201/0215; G05D 1/02; G05D 1/0227; G05D 1/0088; A47L 2201/022; A47L 2201/04; A47L 9/2805; A47L 9/2826; A47L 9/2852; A47L 9/2873; A47L 11/4011; A47L 11/4061; A47L 11/24; A47L 2201/00; A47L 2201/06; A47L 2201/02; G06Q 10/00; B25J 9/1664; B25J 9/1679; B25J 11/0085; B25J 19/005; B25J 9/0003; B25J 9/1697; B25J 9/16; B25J 5/007; B25J 19/02
 See application file for complete search history.

(56) References Cited

U.S. PATENT DOCUMENTS

| | | | |
|---|---|---|---|
| 10,882,186 B1 * | 1/2021 | Ebrahimi Afrouzi | ............. B25J 11/0085 |
| 10,884,420 B2 * | 1/2021 | Deng | ............. G05D 1/0219 |
| 11,054,836 B2 * | 7/2021 | Wang | ............. B25J 9/1664 |
| 11,064,858 B2 * | 7/2021 | Yoon | ............. A47L 9/0494 |
| 2006/0076917 A1 * | 4/2006 | Lim | ............. G05D 1/0246 318/568.12 |
| 2017/0265703 A1 * | 9/2017 | Park | ............. B25J 9/16 |
| 2017/0303761 A1 | 10/2017 | Chang | |
| 2018/0174322 A1 | 6/2018 | Hu | |
| 2018/0200888 A1 | 7/2018 | Kim et al. | |
| 2019/0049976 A1 * | 2/2019 | Erkek | ............. A47L 5/22 |

FOREIGN PATENT DOCUMENTS

| | | |
|---|---|---|
| KR | 10-2016-0021991 | 2/2016 |
| KR | 10-2018-0085309 | 7/2018 |
| KR | 10-2019-0088824 | 7/2019 |
| TW | 201909827 | 3/2019 |

OTHER PUBLICATIONS

Taiwanese Office Action dated Feb. 17, 2021 issued in TW Application No. 108140722.

* cited by examiner

FIG. 7
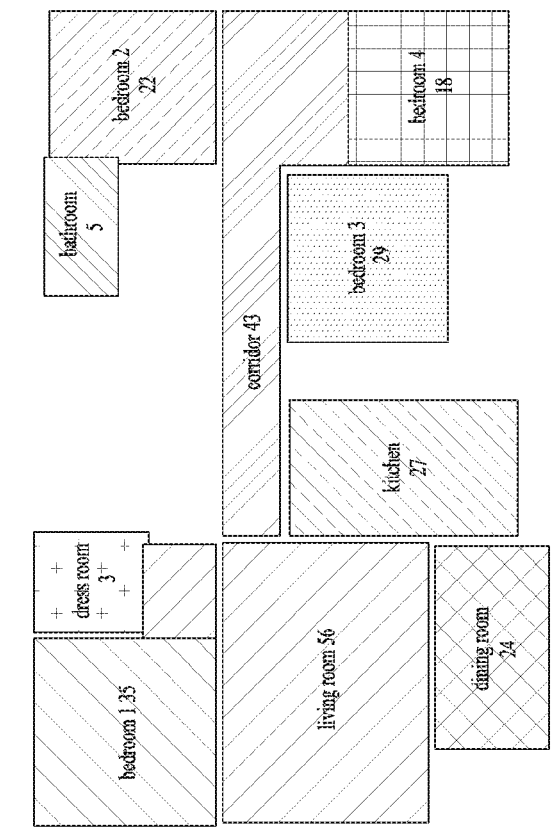
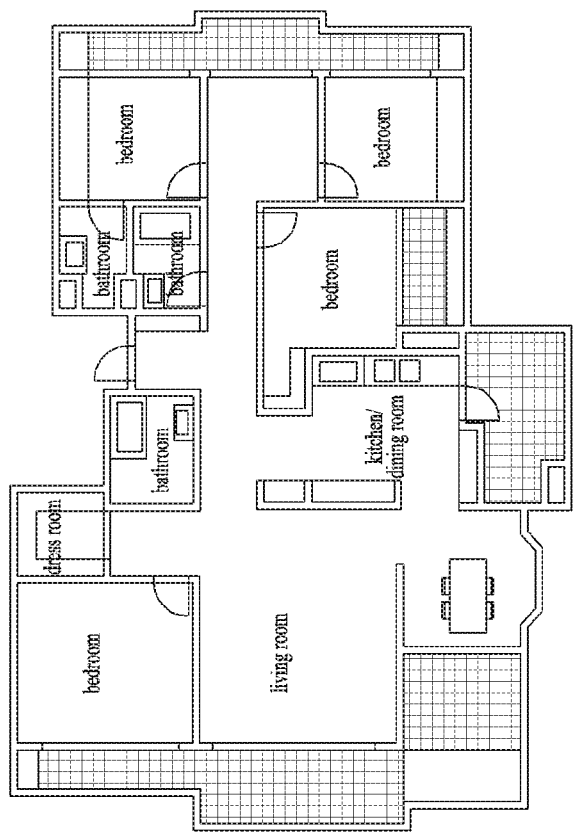

FIG. 9
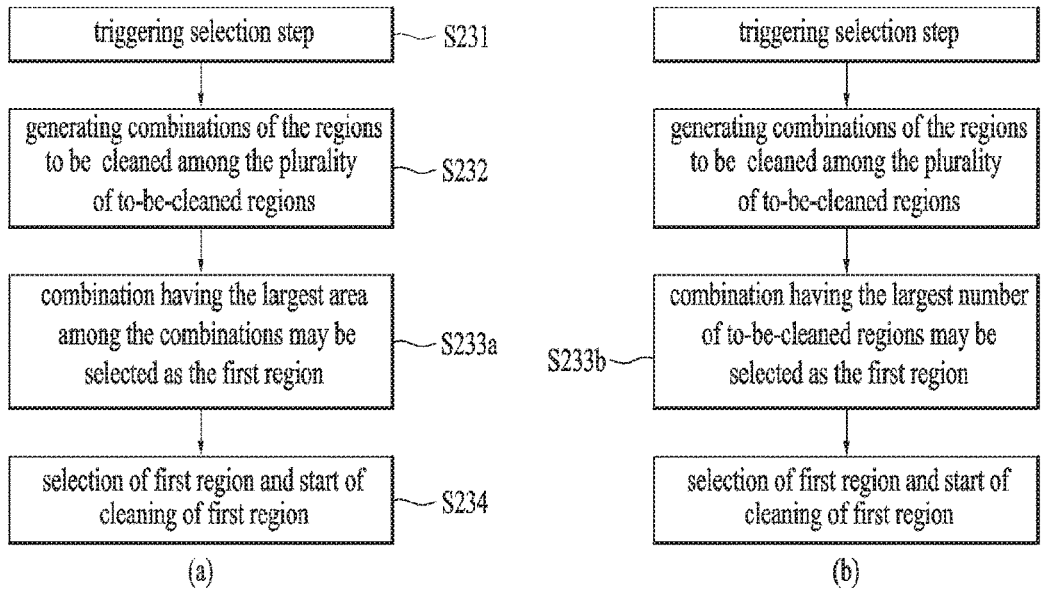
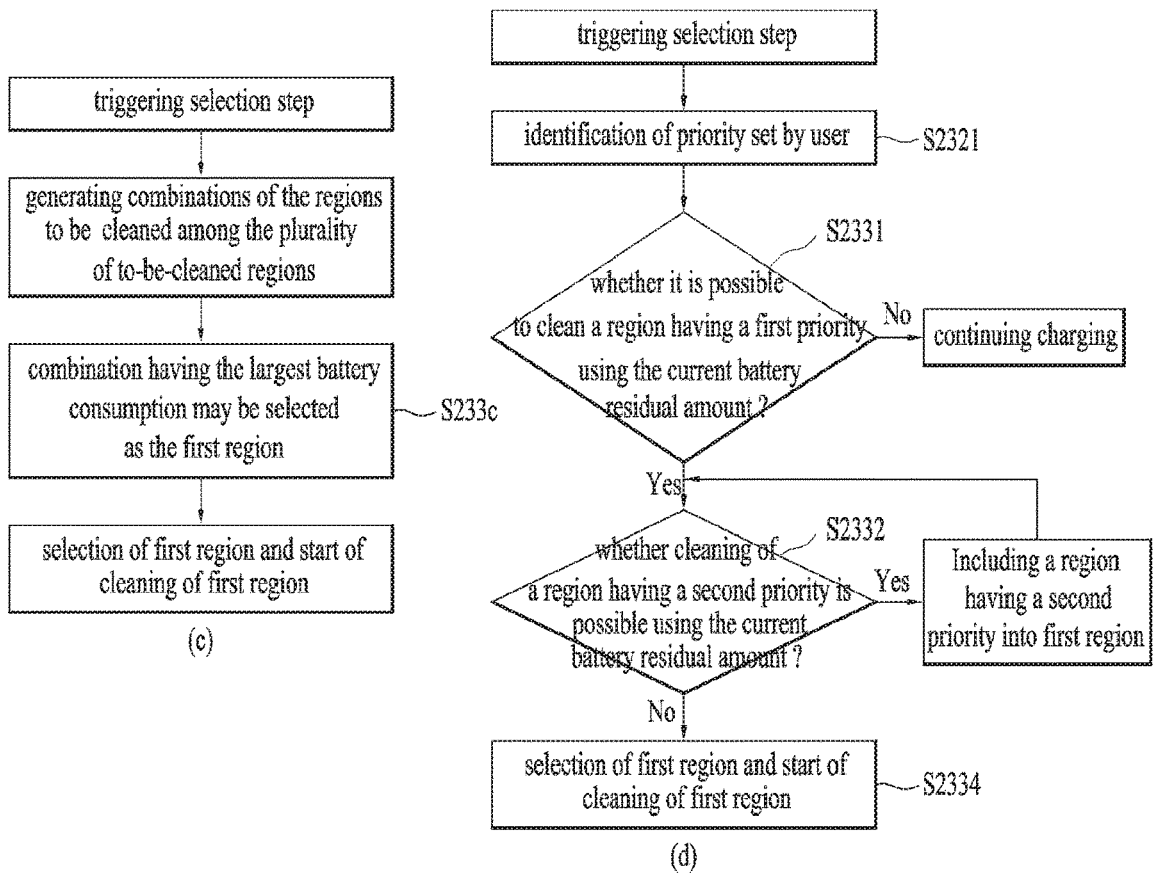

ROBOT CLEANER AND METHOD FOR CONTROLLING THE CLEANER

CROSS-REFERENCE TO RELATED APPLICATION

This application claims priority under 35 U.S.C. § 119 to Korean Application No. 10-2019-0103524, filed in Korea on Aug. 23, 2019, whose entire disclosure is hereby incorporated by reference.

BACKGROUND

1. Field

The present disclosure relates to a robot cleaner and a method for controlling the cleaner.

2. Background

Humans clean their spaces for hygiene and cleanliness. There may be several reasons for cleaning. For example, the cleaning is to protect bodies from disease or to prevent bronchial damage or to improve the quality of their lives to keep a clean space available.

Dust and foreign matter sink to the floor by gravity. Therefore, in order to clean the dust, people should bend a waist or sit to perform cleaning. Thus, a waist or knee joint may be damaged.

Recently, cleaners that help people clean have appeared. The cleaners may be roughly classified into a hand-stick cleaner, a bar type cleaner or a robot cleaner.

Unlike the hand-stick cleaner or the bar cleaner, the robot cleaner does not only assist human for cleaning but also automatically cleans the floor. To perform the automatic cleaning, the robot cleaner includes a battery that may be charged repeatedly and includes a separate charging station.

Continuous research and development may allow a lot of techniques for cleaning schemes using the robot cleaner. In this connection, when the battery level of the robot cleaner is lower than a preset value, the robot cleaner returns to the charging station where the robot perform charging.

For example, referring to U.S. Pat. No. 9,215,957, as the robot cleaner performs the cleaning, the robot cleaner compares an amount of energy required to fully charge the battery with an amount of energy required to complete the cleaning. If the amount of energy required to complete the cleaning is lower than the amount of energy required to fully charge the battery, the robot cleaner moves back to the charging station, and is partially charged and then to return to a cleaning region.

The above reference is incorporated by reference herein where appropriate for appropriate teachings of additional or alternative details, features and/or technical background.

BRIEF DESCRIPTION OF THE DRAWINGS

Embodiments will be described in detail with reference to the following drawings in which like reference numerals refer to like elements, and wherein:

FIG. 7 shows a division of a cleaning target area into to-be-cleaned regions by a robot cleaner according to one embodiment of the present disclosure;

FIG. 9 illustrates a region selection step by the robot cleaner according to an embodiment of the present disclosure;

DETAILED DESCRIPTION

Hereinafter, specific embodiments of the present disclosure will be described with reference to the drawings. The following detailed description is provided to assist in a comprehensive understanding of methods, devices, and/or systems described herein. However, this is merely an example and the present disclosure is not limited thereto.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure. Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Figure 1:
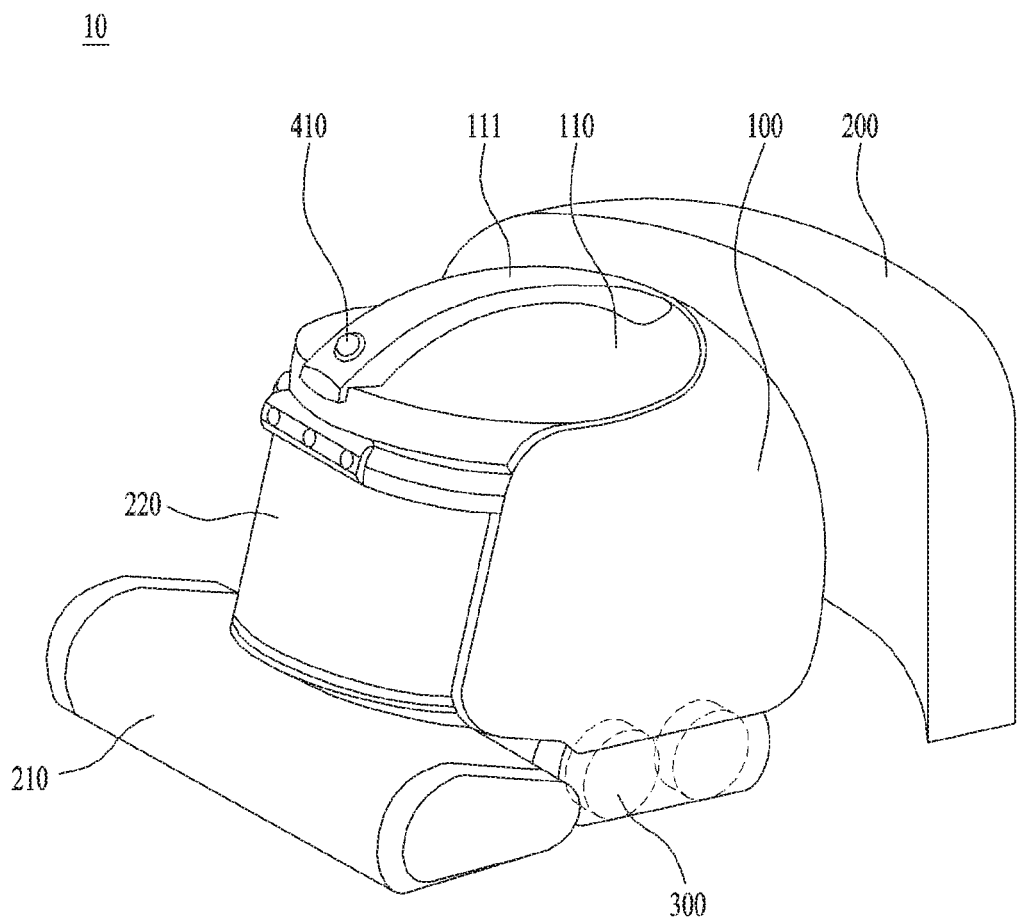
FIG. 1 shows a robot cleaner according to an embodiment of the present disclosure.

FIG. 1 illustrates a robot cleaner 10 according to an embodiment of the present disclosure. The robot cleaner (also referred to as a robot or autonomous cleaner) 10 according to an embodiment of the present disclosure may include a main body 100, a cleaning unit (also referred to as a suction head or cleaning head) 200, a driving unit (or driving motor) 300, and a sensing unit (or sensor) 400. Further, the robot cleaner 10 according to an embodiment of the present disclosure may include a battery (not shown) that provides power to the cleaning unit 200, the driving unit 300, and the sensing unit 400 described above.

The battery may be provided as a secondary battery and repeatedly charged. Therefore, the user may charge and use the battery without replacing or adding a battery when the residual amount of the battery is small.

The robot cleaner 10 may be charged while being coupled with the charging station 200. The charging station 200 may be formed to correspond to at least a portion of the appearance of the robot cleaner 10. Therefore, the robot cleaner 10 can be stably combined with the charging station 200.

The main body 100 may provide a space in which parts of the robot cleaner 10 according to one embodiment of the present disclosure are embedded. Further, the main body 100 may receive therein the cleaning unit 200, the driving unit 300, and the sensing unit 400 described later. Therefore, the main body 100 of the robot cleaner 10 may form the appearance of the robot cleaner 10.

The top cover 110 is disposed on a top of the main body 100. The top cover 110 may be configured to be hinge-coupled to one end of the main body 100 to pivotable. The top cover 110 may be detachably coupled to the main body 100. The separation of a dust collector 220 from the body may be restricted while the top cover 110 covers the dust collector 220.

A handle 111 is provided on a top of the top cover 110. A sensing unit 400 may be disposed at the handle 111. In this connection, the sensing unit may be an imaging sensor 410 described later. The imaging sensor 410 may be preferably inclined with respect to a bottom surface of the main body 100 so as to image a front and upper scene.

The main body 100 may be configured so that internal components therein are not exposed to the outside. As described above, the robot cleaner 10 may function when the various components are connected to each other. Therefore, when the parts operate, the user's body may be injured due to the user's carelessness or malfunction of the cleaner. Therefore, the main body 100 can screen the internal parts to prevent safety accidents. Further, the presence of the main body 100 may allow the complex interior not to be exposed to the outside, to improve aesthetics.

The cleaning unit 200 may substantially perform cleaning. The cleaning unit 200 may largely include a dust suction unit 210 which sucks in dust, a nozzle (not shown) to which the suctioned dust is moved, a filter unit (not shown) which separates air and dust from each other, and a dust collector 220 where dust is collected. FIG. 1 shows an example of a robot cleaner 10. The cleaner 10 does not have to be configured as shown in FIG. 1. That is, the cleaner is not limited to the configuration shown in FIG. 1.

Specifically, the robot cleaner 10 may drive and the dust suction unit 210 may operate to inhale dust or foreign substances on the floor. At this time, since the dust and air are sucked together, the air and dust moved to the nozzle may be separated from each other by the filter unit. The air passing through the filtration unit may be discharged to the outside again and the sucked dust or foreign matter may be accommodated in the dust collector. The filtration unit may be configured in the form of a filter or may be configured to separate air and dust from each other in a structural manner using a cyclone phenomenon.

The dust collector may be configured to be detachable or attachable from or to the body. When the dust collector becomes full during cleaning or after cleaning, a display panel may be configured to inform this fact to the user. When the dust collector is full, the dust inside the dust collector may be emptied to perform the cleaning again smoothly.

The cleaning unit 200 may be coupled to the main body 100. The cleaning unit 200 and the main body 100 do not necessarily have to be separately configured and may be formed integrally with other. However, in order to perform the effective cleaning, the dust suction unit 210 may be configured in a polygonal shape so as to clean a large area. In particular, since the robot cleaner 10 generally moves in a linear motion, it may be preferable that the robot cleaner 10 is formed in a square shape.

The driving unit 300 may move the main body 100. Therefore, the driving unit 300 is preferably configured in the form of a wheel. The driving unit 300 may be respectively disposed on each of the left and right sides of the main body 100.

Each driving unit 300 may be operated by each motor. That is, the driving units 300 may be controlled to be rotated at different rotation speeds. Therefore, the robot cleaner 10 can turn in the left or right direction. Further, the robot cleaner 10 may be configured to be able to move forwardly or rearwardly.

That is, the driving speed of the robot cleaner 10 may be determined according to the rotation speed of the driving unit 300. The driving direction may be determined by the difference between the rotation speed of the left and right driving units 300.

For example, when the driving unit 300 on the left maintains the stopped state and the driving unit 300 on the right rotates, the robot cleaner 10 may turn to the left. When the driving unit 300 on both sides is operating, but the driving unit 300 on the right side rotates faster than the driving unit 300 on the left side, the driving unit 300 may turn to the left side and continue the straight motion.

Further, the driving unit 300 may be configured in the form of a wheel. The present disclosure is not limited thereto. The driving unit 300 may be configured as a combination of rollers and a chain.

The sensing unit 400 may collect information necessary for autonomous driving of the robot cleaner 10. For example, the sensing unit may include an imaging sensor 410 for imaging the surroundings to create a driving map, a floor detection sensor 430 for detecting a floor material, and an obstacle sensor 420 for detecting an obstacle. Further, in another example, additional sensors may be further configured in addition to the above-described sensor.

For example, a wall detection sensor (not shown) may be included. Therefore, information about the cleaning target area may be input to the robot cleaner 10 through a wall detection sensor and an imaging sensor 410. The robot cleaner 10 may receive the shape of the spaces of the regions through a wall detection sensor while moving along the regions and, then, divide the cleaning target area into multiple to-be-cleaned regions.

However, the present disclosure is not limited to the above example. In one embodiment, the imaging sensor 410 or the obstacle sensor 420 may simultaneously perform wall detection.

In addition to detecting only the cleaning target area, the imaging sensor may be configured to specify the position of the main body 100 in the previously input cleaning target area. In this way, the robot cleaner 10 may specify the location of the space for cleaning. Specifying the location of the robot cleaner 10 may guide movement of the robot cleaner to the next cleaning region.

The type and number of the imaging sensors 410 are not limited to specific ones. That is, the plurality of imaging sensor 410 may be provided. When the plurality of imaging sensors 410 may be provided, the plurality of imaging sensor 410 may be composed of homogeneous or heterogeneous imaging sensors 410.

The floor detection sensor 430 may be a sensor for detecting a material of the floor. The cleaning target area for which the robot cleaner 10 is used may vary from user to user. For example, the floor covering of the cleaning target area may be in the form of marble or in the form of a plastic plate or may be made of a material other than the above-described materials.

Depending on the material of the floor, the intensity at which the dust suction unit 210 is driven to effectively suck dust may vary. For example, the dust suction unit 210 may be operated more strongly in a carpet area than in a general floor plate, so that the cleaning may be effectively performed. The controller 500 of the robot cleaner 10 may be configured to control the suctioning intensity of the dust suction unit 210 according to the type of flooring material.

The obstacle sensor 420 may determine whether an obstacle exists in the cleaning target area. The obstacle sensor 420 may be integrated with the imaging sensor 410 described above or may be configured separately therefrom. That is, the imaging sensor 410 may function as the obstacle sensor 420.

As the obstacle sensor 420 detects the obstacle, the moving path of the robot cleaner 10 may be changed. As the moving path become more complex, battery consumption may vary. In detail, if there is an obstacle, the robot cleaner 10 may bypass the obstacle. Thus, the moving path may increase. Thus, the amount of battery used to clean the corresponding region may increase.

Figure 2:
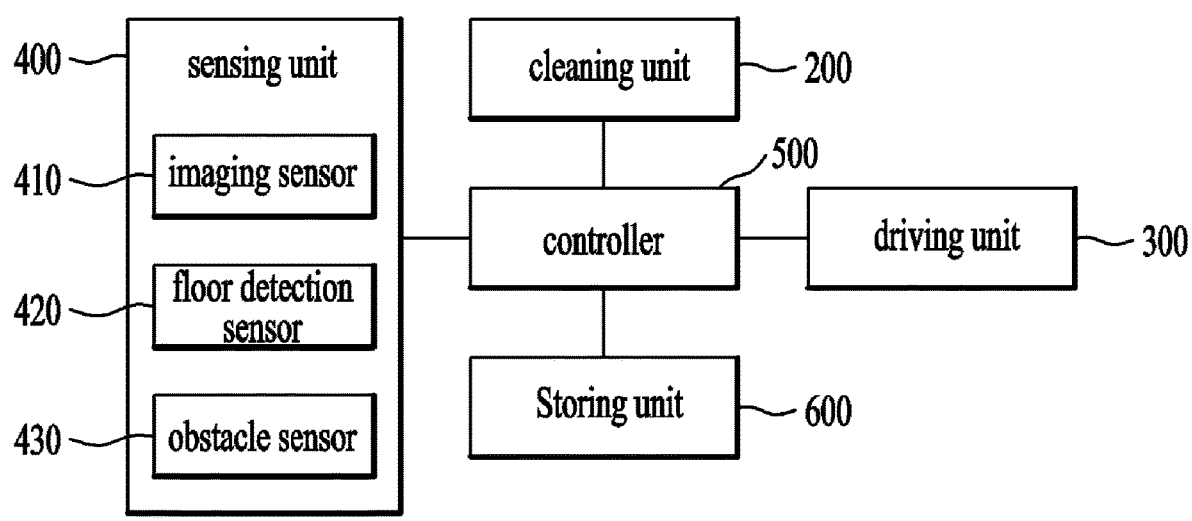
FIG. 2 is a block diagram showing connections between components of the robot cleaner according to an embodiment of the present disclosure.

FIG. 2 is a block diagram showing the connections between the components of the robot cleaner according to an embodiment of the present disclosure. The robot cleaner 10 according to an embodiment of the present disclosure may further include a controller 500 and a storage unit 600.

The controller 500 may receive information from the sensing unit 400 described above and control the operation of the driving unit 300 and the cleaning unit 200 based on the information. Further, the information input to the controller 500 may be stored in the storage unit 600 so that the cleaning may be effectively performed even when the cleaning target area is not selected at a corresponding timing. When the cleaning target area is changed or when it is necessary to select the cleaning target area again due to relocation of furniture, etc. the map data stored in the storage unit 600 can be deleted and updated. In another embodiment of the present disclosure, the robot cleaner 10 may store several map data and may perform cleaning based on one map data.

The controller 500 may control the driving unit 300 and the cleaning unit 200. The driving unit 300 and the cleaning unit 200 may be operated and cleaned under the control of the controller 500. As described above, each driving unit 300 mounted on each of both sides of the main body 100 may be individually controlled.

As described above, the cleaning unit 200 may be controlled to change the suction intensity according to the type of the floor covering of the cleaning target area. Further, the battery consumption of the cleaning target area may be measured and stored in the storage unit 600 based on the data provided from the sensing unit 400 and the information provided from the driving unit 300 and the cleaning unit 200.

In detail, the cleaning target area may be divided into a plurality of to-be-cleaned regions to measure an amount of battery consumed for each of the plurality of to-be-cleaned regions. The amount of battery required may be proportional to a dimension of each to-be-cleaned region. However, the amount of battery required may vary not only based on the dimension but also based on the suction intensity of the cleaning unit 200, the material of the floor covering, and the movement path of the robot cleaner 10 for each to-be-cleaned region. Thus, it may not be concluded that a larger to-be-cleaned region always consumes more battery amount than a smaller to-be-cleaned region.

Figure 3:
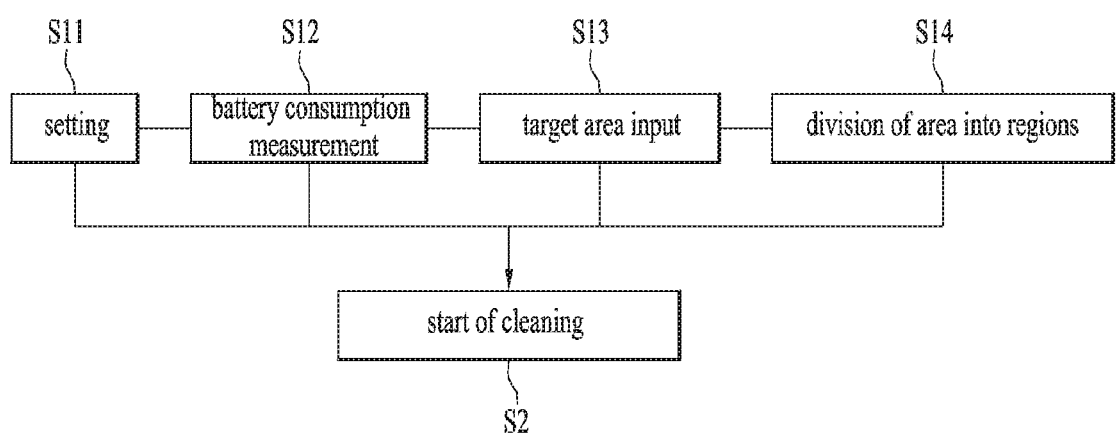
FIG. 3 schematically shows a cleaning method by a robot cleaner according to an embodiment of the present disclosure.

FIG. 3 schematically illustrates a cleaning method by a robot cleaner according to an embodiment of the present disclosure. Prior to the description thereof, the cleaning target area recited in the present specification refers to an area which the user intend to clean. For example, if a user wants to exclude a bedroom when cleaning at home, the cleaning target area may be a part of the house except the bedroom.

The robot cleaner may select the area where cleaning is performed, as described below S11. In another example, the whole house may be set as a cleaning target area. When the user inputs data, a specific area may be excluded based on the input data from the cleaning target area.

Further, a plurality of to-be-cleaned regions may be defined by the user. Alternatively, when an entire area to be cleaned is input as the cleaning target area, the robot cleaner may arbitrarily divide the area into the plurality of to-be-cleaned regions using the above-described sensing unit 400. In this connection, the user may vary the division into the to-be-cleaned regions.

A cleaning method by the robot cleaner 10 according to an embodiment of the present disclosure will be described below. First, before the cleaning starts, the cleaning target area may be set S11. Then, the battery consumption for cleaning of the set area S12 may be measured and then input to the controller 500. Further, when the cleaning target area is input S13, the controller may divide the area into a plurality of to-be-cleaned regions S14. Then, the battery consumption for cleaning of each to-be-cleaned region may be measured.

In FIG. 3, the cleaning target area is set S11, the battery consumption therefor is measured S12, and the cleaning target area input S13 and the area is divided into a plurality of to-be-cleaned regions S14. However, the present disclosure is not limited thereto. When the robot cleaner 10 sets the cleaning target area, the battery consumption therefor may be measured at the same time.

Similarly, during the setting step, the cleaning target area may be input and divided into a plurality of to-be-cleaned regions during setting. When the cleaning target area is split into multiple to-be-cleaned regions, each to-be-cleaned region may be prioritized. A prioritization method will be described briefly. The clearing priorities of the to-be-cleaned regions may be determined based on proximity thereof to the charging station 200. In this connection, the amount of battery required for cleaning of each to-be-cleaned region may be input. Details of the prioritization will be described later.

In other words, the cleaning target area to be cleaned by the robot cleaner 10 may be input before the robot cleaner 10 performs the cleaning. The cleaning target area may be divided into a plurality of to-be-cleaned regions via the wall or structure. However, the cleaning target area may not necessarily be divided into the regions via structures or walls sensed by robot cleaner 10. The user may arbitrarily divide the area into the plurality of to-be-cleaned regions. Then, the battery consumption for cleaning of each to-be-cleaned region may be measured.

Figure 4:
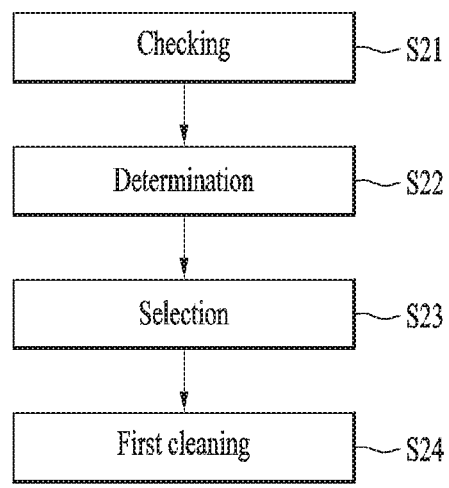
FIG. 4 to FIG. 6 show a method for controlling a robot cleaner according to one embodiment of the present disclosure.
Figure 5:
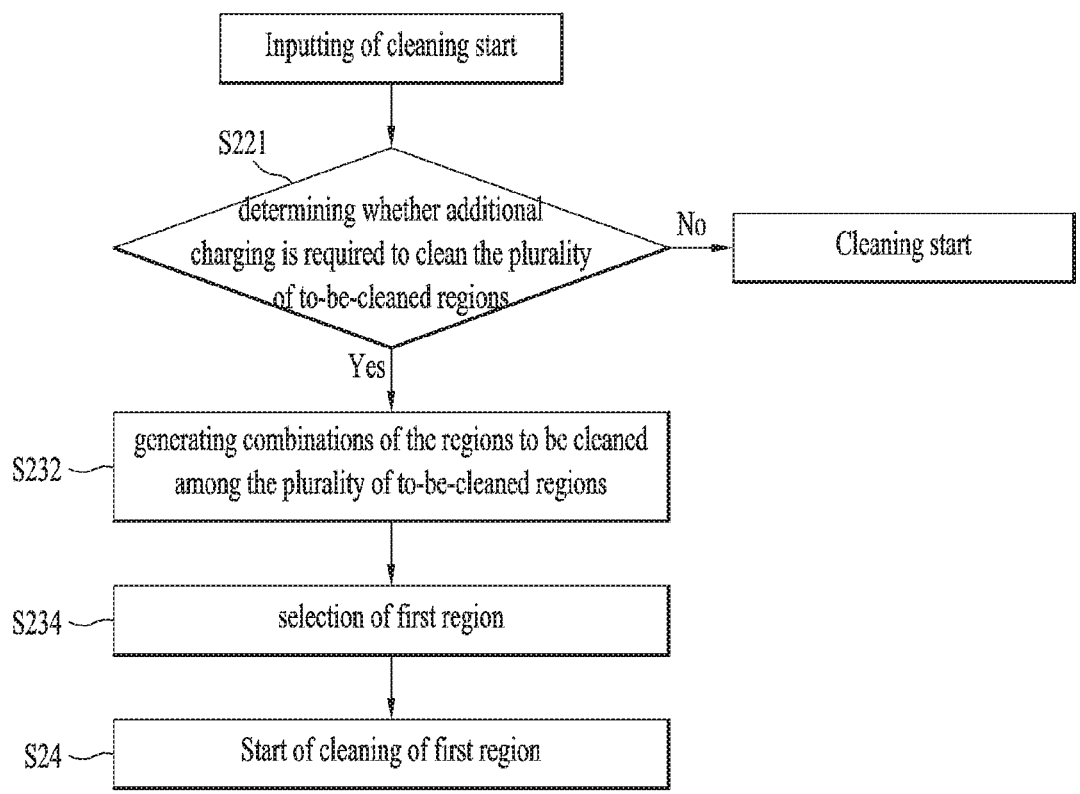
Figure 6:
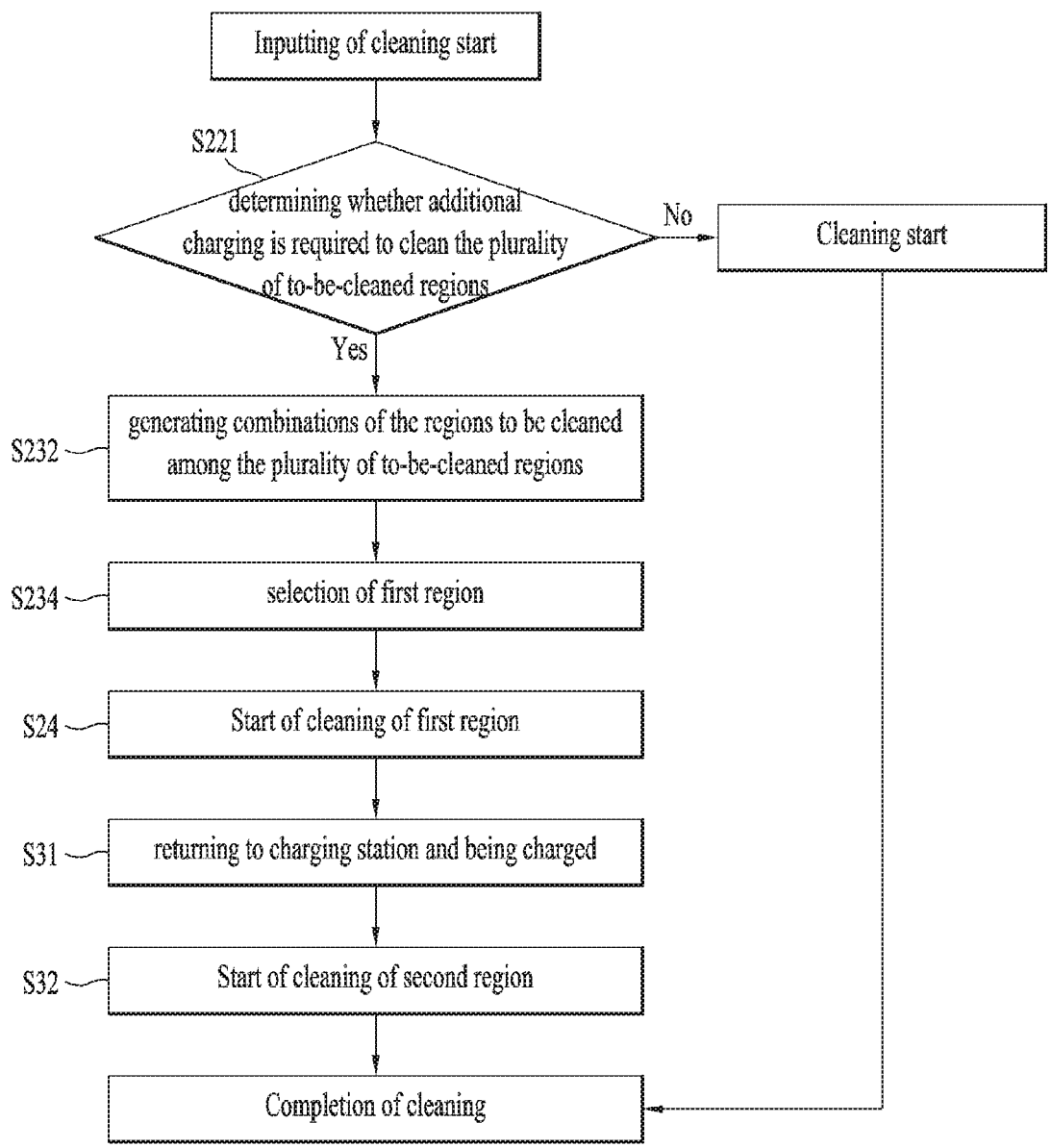

FIG. 4 to FIG. 6 illustrate a method for controlling a robot cleaner according to an embodiment of the present disclosure. Hereinafter, a method for establishing a cleaning plan for the robot cleaner 10 when starting cleaning will be described.

First, referring to FIG. 4 and FIG. 5, the robot cleaner 10 according to an embodiment of the present disclosure may establish a cleaning plan at the time of starting cleaning. The method for controlling the robot cleaner according to an embodiment of the present disclosure includes a referring step of referring to mapping data (mapping between the to-be-cleaned region and the battery consumption for cleaning of the to-be-cleaned region) S21, a determination step S22 for determining whether additional charging is required for cleaning an entirety of the cleaning target area, a selection step S23 for selecting a first region to be cleaned before performing additional charging when it is determined that additional charging is required to clean all of to-be-cleaned regions in the area, and a first cleaning step to clean the first region Specifically, in the referring step S21, the input mapping data may be referred to before starting cleaning. The robot cleaner according to one embodiment of the present disclosure identifies the cleaning target area and a plurality of to-be-cleaned regions into which the area divides, and checks battery consumption for cleaning of each of the to-be-cleaned regions. That is, the battery consumption of cleaning of each of the prioritized to-be-cleaned regions may be checked.

The determination step S22 may include a step S221 for determining whether additional charging is required to clean the plurality of to-be-cleaned regions. That is, the determination step S22 may include comparing a current battery residual amount of the robot cleaner 10 with an amount of battery required to clean the cleaning target area. In other words, the step 22 may include a step of comparing the current battery residual amount of the robot cleaner 10 with the amount of battery used to clean all of the plurality of to-be-cleaned regions.

When, from the determination result in step S22, no additional charging is required to clean the cleaning target area, the robot cleaner starts cleaning the cleaning target area. However, when additional charging is required to clean the cleaning target area, the first region to be cleaned should be determined before performing the additional charging. Therefore, a cleaning plan by the robot cleaner 10 may be established based on the determination step S22.

The selection step S23 may yield combinations of the regions to be cleaned among the plurality of to-be-cleaned regions, and may selecting one of the combinations. The selected combination may be determined as the first region S234. For example, 1 to 10 to-be-cleaned regions are present. #1, 4, 6 to-be-cleaned regions can be cleaned or #1, 5, 7 to-be-cleaned regions cab be cleaned based on the current residual amount of the battery. In this connection, the #1, 4, 6 to-be-cleaned regions or the #1, 5, 7 to-be-cleaned regions may be a combination of regions. In this connection, the robot cleaner 10 may select one of the combinations and clean the selected combination. In this connection, the selected combination may be defined as the first region. Details thereof will be described later.

After the selection step S23 is finished, the first cleaning step S24 is started. In other words, the robot cleaner 10 starts cleaning. In other words, when it is determined that additional charging is required to clean the cleaning target area, the robot cleaner may start cleaning the first region.

As described above, according to embodiments of the present disclosure, the robot cleaner may compare the current remaining amount of battery with the amount of battery for cleaning all of the regions at the beginning of cleaning. Then, upon determination that the former is smaller than the latter, the first region may be selected from among the plurality of to-be-cleaned regions and then the first region may be cleaned. In this connection, the first region may be defined as the combination of the regions.

Referring to FIG. 6, the robot cleaner 10 according to an embodiment of the present disclosure may move back to the charging station 200 after the first cleaning step S24 is completed. In other words, the robot cleaner 10 may be charged to clean a second region as a to-be-cleaned region that has not been selected as the first region among the plurality of to-be-cleaned regions.

In controlling the robot cleaner 10, in order to finish the cleaning as quickly as possible, the battery may not be charged to the maximum amount but may be charged to an amount required for cleaning the second region. As a result, the robot cleaner 10 may minimize the time duration for cleaning the cleaning target area.

However, the present disclosure is not limited to the above description. Therefore, the battery amount may be charged to the maximum level. However, this may increase the cleaning time duration due to the charging of the unnecessary amount. For energy management purposes, it is desirable to charge the battery only to an amount required to clean the second region.

The phrase "charge the battery only to an amount required to clean the second region" may mean not that after cleaning the second region, the battery level is almost zero, but that after cleaning the second region, the battery level remains such that the robot cleaner may return to the charging station 200. That is, the phrase "charge the battery only to an amount required to clean the second region" may mean that a minimum charged amount remains in addition to the battery amount sufficient to clean the second region. Therefore, the method for controlling the robot cleaner 10 according to the present disclosure is advantageous in terms of energy management.

Figure 8:
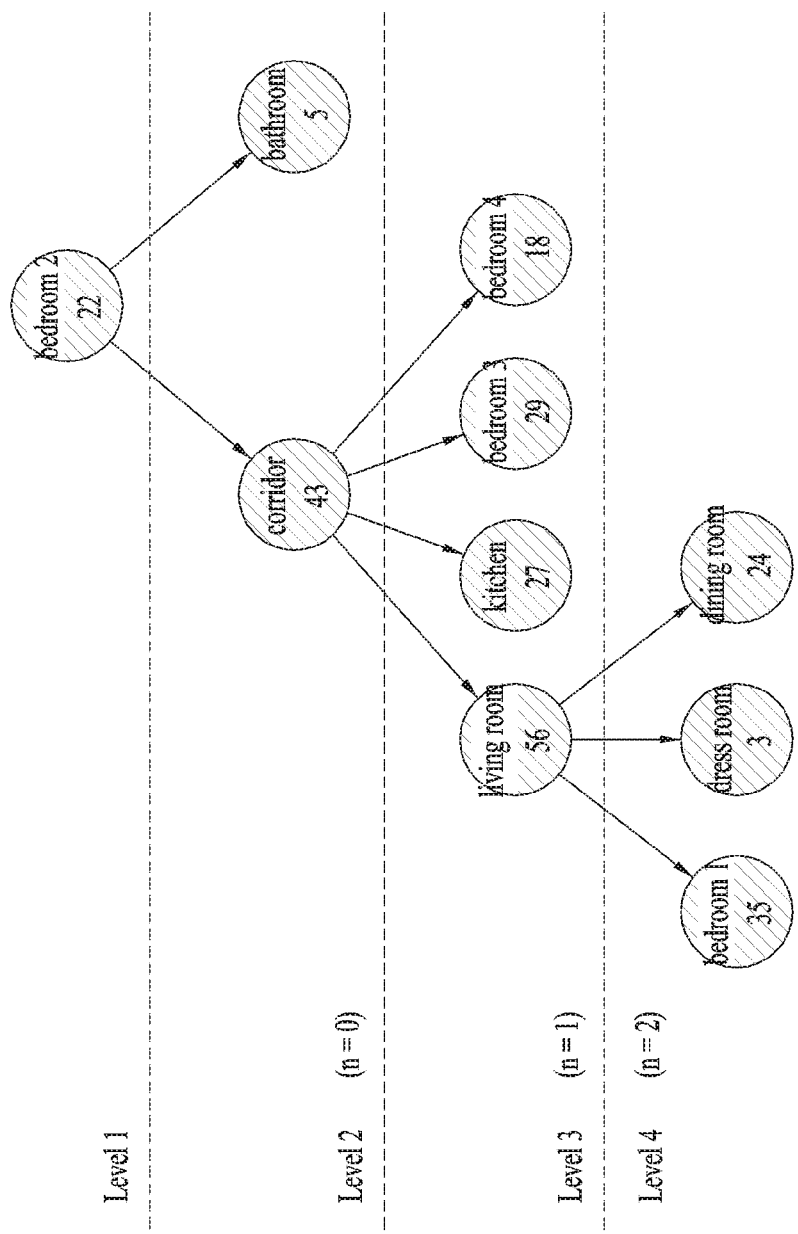
FIG. 8 shows a tree view of to-be-cleaned regions in FIG. 7.

FIG. 7 shows the division of the area into the to-be-cleaned regions by a robot cleaner according to one embodiment of the present disclosure. FIG. 8 shows cleaning priority levels of the to-be-cleaned regions in FIG. 7. Section (a) of FIG. 7 shows a typical house by way of example. Section (b) of FIG. 7 shows measurements of battery consumptions for cleaning of a plurality of to-be-cleaned regions to which the house is divided.

As used herein, the term "adjacently located" "or "proximity to" may mean that the to-be-cleaned regions are connected to each other while another to-be-cleaned region is not present therebetween. For example, a bathroom and a bedroom #2 may be adjacent to each other because another to-be-cleaned region exists therebetween.

For example, referring to FIG. 7 and FIG. 8, a charging station 200 that may charge the robot cleaner 10 may be placed in a bedroom #2. The bathroom and the corridor may be adjacent to the bedroom #2. Further, the bathroom is not connected to any other to-be-cleaned region other than the bedroom #2. The corridor is located adjacent to a to-be-cleaned region other than the bedroom #2. A to-be-cleaned region adjacent to the corridor may be a living room, kitchen, bedroom #3 and bedroom #4, except for the bedroom #2.

Hereinafter, a plurality of to-be-cleaned regions will be prioritized in terms of cleaning using FIG. 7 and FIG. 8 by way of example. The to-be-cleaned region where the charging station 200 is located is the to-be-cleaned region having a first cleaning priority. Further, when the number of to-be-cleaned regions existing between each of the to-be-cleaned regions and the to-be-cleaned region where the charging station 200 is located is n, each to-be-cleaned region may have an (n+2)-th cleaning priority. In this connection, n may be 0 or a natural number.

Referring to FIG. 8 by way of example, the to-be-cleaned region where the charging station 200 is located is the bedroom #2. In this connection, the bedroom #2 is a to-be-cleaned region with the first cleaning priority. The corridor and bathrooms which are adjacent to the bedroom #2 may be classified to have a second cleaning priority. Because the corridor and bathroom are directly connected to the bedroom #2, there is no other to-be-cleaned region between the to-be-cleaned region having the first priority level and each of the corridor and bathroom (that is, n=0).

Because the bathroom is not adjacent to any other to-be-cleaned region other than the bedroom #2, the bathroom does not have to-be-cleaned regions having the third priorities. That is, the bathroom does not have to-be-cleaned regions having next-order priorities.

In addition to the bedroom #2, the corridor is connected to or adjacent to the living room, kitchen, bedroom #3 and bedroom #4. Each of the living rooms, kitchen, bedrooms #3 and #4 may be a to-be-cleaned region having a third cleaning priority (n=1). This is because the corridor is present between each of the living room, kitchen, bedroom #3 and bedroom #4 and the bedroom #2.

Similarly, each of the bedroom #1, the dressing room and the dining room may be to-be-cleaned region having the fourth cleaning priority (n=2). The to-be-cleaned regions may be classified into a first to-be-cleaned region type that does not have a to-be-cleaned region having the next cleaning priority as described above, and a second to-be-cleaned region type free of the next cleaning priority as described above.

FIG. 9 shows a region selection step by a robot cleaner according to an embodiment of the present disclosure. When the selection step S23 is started, the robot cleaner 10 may yield combinations of the regions among the plurality of to-be-cleaned regions. In this connection, the number of the regions in each of the combinations of the regions to be selected may be in a range of the number of the regions which can be cleaned using the current battery residual amount of the robot cleaner 10. The robot cleaner 10 selects one of the combinations as the first region S234.

A reference factor for selecting the combination as the first region may vary depending on the embodiments. Referring first to section (a) of FIG. 9, A combination having the largest area among the combinations may be selected as the first region S233*a*. Alternatively, as shown in section (b) of FIG. 9, a combination having the largest number of to-be-cleaned regions may be selected, in S233*b*, as the first region. Alternatively, as shown in section (c) of FIG. 9, a combination having the largest battery consumption may be selected as the first region S233*c*.

In another example, the area of the to-be-cleaned region may be a major reference factor in determining the battery consumption. However, the battery consumption is not determined by the size of the to-be-cleaned region area. Therefore, in the selection step S23 in which the first region is selected, the combination having the largest clearing area and the combination with the highest battery consumption may be different from each other.

Similarly, a combination of the largest number of the to-be-cleaned regions may not correspond to a combination of the regions having the largest cleaning area. Therefore, in the selection step S23 in which the first region is selected, the combination of the largest number of to-be-cleaned regions and the combination of the regions having the largest area may be different from each other.

Further, referring to section (d) of FIG. 9, the cleaning may be performed according to the cleaning priority input by the user. Specifically, when the selection step S23 starts, the controller may identify the cleaning priority set by the user and then determine whether the region having the first cleaning priority can be cleaned based on the current battery residual amount. In this connection, if it is determined that cleaning of the region with the first cleaning priority is not possible, the robot cleaner 10 will continue charging.

If it is determined that cleaning of the region with the first cleaning priority is possible, the controller may determine whether a region with the next cleaning priority can be cleaned. If it is determined that cleaning of the region with the next cleaning priority is not possible, the controller may select the first region and begin cleaning the first region. If it is determined that cleaning of the region with the next cleaning priority is possible, the controller then determines whether the region with a further next cleaning priority can be cleaned. This may be determined based on a result of comparing the current battery residual amount with the battery amount consumed for cleaning of all of the to-be-cleaned regions included in the first region.

The control methods as described above may be input and operated in the robot cleaner 10. All of the control methods described above may be input to one robot cleaner 10 and operated according to the user's selection thereof. Accordingly, one of the above-described embodiments may be implemented according to the user's selection.

Figure 10:
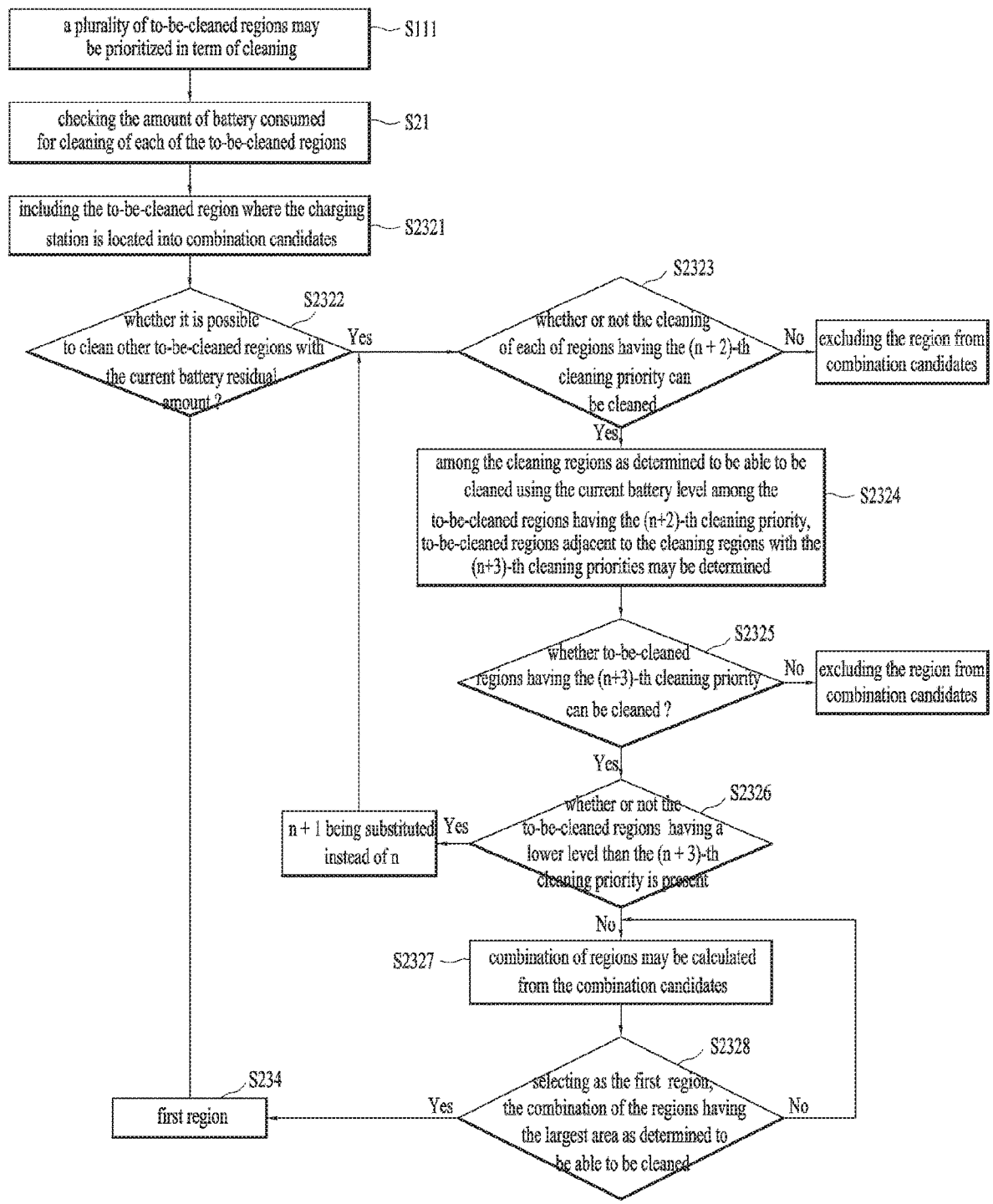
FIG. 10 illustrates a control method in which a robot cleaner selects a first region according to an embodiment of the present disclosure.

FIG. 10 illustrates one of the control methods in which a first region is selected by a robot cleaner according to an embodiment of the present disclosure. Referring to section (a) of FIG. 9 as an example, the robot cleaner 10 may be controlled to select a region or a combination of regions having the largest area as the first region. FIG. 10 shows an example of a control method in which a first region is selected when the robot cleaner 10 is controlled to select a region or a combination of regions having the largest area as the first region.

Before starting cleaning, the robot cleaner 10 may determine a cleaning target area and dividing the area into a plurality of the to-be-cleaned regions. In this connection, a plurality of to-be-cleaned regions may be prioritized in term of cleaning with reference to the to-be-cleaned region where the charging station 200 is located S111. Further, the battery consumption for cleaning of each of a plurality of to-be-cleaned regions can be measured and stored.

The robot cleaner 10 checks the amount of battery consumed for cleaning of each of the to-be-cleaned regions when cleaning starts S21. In order to select the first region, a plurality of combinations of regions among the plurality of to-be-cleaned regions may be generated. The following describes a method for selecting one from the combinations.

First, the method may include the to-be-cleaned region where the charging station 200 is located into combination candidates S2321. As described above, the to-be-cleaned region in which the charging station 200 is located is classified to have a first cleaning priority. Then, the controller may determine whether it is possible to clean other to-be-cleaned regions with the current battery residual amount S2322. In this connection, if it is determined that cleaning of the other to-be-cleaned regions is not possible, the first region may be defined as a single to-be-cleaned region where the charging station 200 is located.

When it is determined that cleaning of the other to-be-cleaned regions is possible using the current battery residual amount, it is then determined whether or not the cleaning of each of regions having the (n+2)-th cleaning priority can be cleaned. In this connection, n may be 0, 1, 2 or greater. This may vary depending on the area or structure of the cleaning target area.

Then, the controller may determine whether cleaning of each of the cleaning regions having the (n+2)-th cleaning priority is possible using the current battery level. Then, the to-be-cleaned regions as determined not to be able to be cleaned among the regions may be excluded from the combination candidates. That is, the robot cleaner 10 may exclude from the combination candidate a single to-be-cleaned region which can be partially cleaned using the current battery level among the cleaning regions having the n+2th cleaning priority. That is, a single to-be-cleaned region which can be entirely cleaned using the current battery level may be included in the combination candidate.

Then, among the cleaning regions as determined to be able to be cleaned using the current battery level among the to-be-cleaned regions having the (n+2)-th cleaning priority, to-be-cleaned regions adjacent to the cleaning regions with the (n+3)-th cleaning priorities may be determined S2324. In operation S2325, it may be determined whether to-be-cleaned regions having the (n+3)-th cleaning priority can be cleaned.

The determining of whether cleaning regions having the (n+3)-th cleaning priority can be cleaned S2325 may not be based on the residual amount of the battery before cleaning starts, but may be based on a residual amount of the battery after cleaning the to-be-cleaned region where the charging station 200 is located and the regions determined to be able to be cleaned among the to-be-cleaned regions with the (n+2)-th cleaning priority. For example, when the battery residual amount is 45% and the cleaning of the region in which the charging station 200 is located will consume 13% and 20% is consumed for cleaning the to-be-cleaned region with the second cleaning priority, it is desirable to determine whether cleaning of the to-be-cleaned regions with the third cleaning priority is possible using a battery residual amount of 11%. Among the to-be-cleaned regions having the (n+3)-th cleaning priority, the to-be-cleaned regions as determined not to be able to be cleaned may be excluded from the combination candidate.

As described above, before determining whether cleaning of the regions having the next order cleaning priority, whether cleaning of regions having the cleaning priority higher than the next order cleaning priority is possible may be determined in advance. This is because a configuration that even when the cleaning of regions having the cleaning priority higher than the next order cleaning priority is not possible, the robot moves to and clean the region having the next order cleaning priority, and then returns to the charging station 200 is undesirable in terms of energy efficiency and cleaning efficiency.

Thereafter, the controller may determine whether or not the to-be-cleaned regions adjacent to the region having the (n+3)-th cleaning priority is present. If so, the process described above is repeated. In this connection, n+1 may be substituted instead of n to repeat the above process. Thus, the candidates of to-be-cleaned regions to be included in the first region may be selected across the entirety of the cleaning target area.

When the candidates of to-be-cleaned regions to be included in the first region are selected, a combination of regions may be calculated from the combination candidates S2327. In one example, the controller may select S2328 as the first region, the combination of the regions having the largest area as determined to be able to be cleaned using the battery residual amount of the robot cleaner 10 at the beginning of the cleaning, among the possible combinations. Then, the robot cleaner may clean the first region.

Hereinafter, a description will be made with reference to the example shown in FIG. 8. When the battery residual level is 95% when the cleaning starts, a combination of regions that may be selected as a first region may include Combination 1 composed of Bedroom #2, Corridor, Bedroom #4, Bathroom #1, Combination 2 composed of Bedroom #2, Corridor, Kitchen, and Combination 3 composed of Bedroom #2, Corridor, and Bedroom 3.

As described above, a large battery consumption may not correspond always to a large cleaning area. However, when assuming that the battery consumption increases according to the cleaning area, cleaning of Combination 1 consumes 88% of battery capacity. Cleaning of Combination 2 consumes 92% of battery capacity. Cleaning of Combination 3 consumes 94% of battery capacity.

Therefore, when the combination 3 is selected, the robot can clean the largest area. Thus, the robot cleaner 10 may select the combination 3 as the first region. The reference factor for selecting the first region may vary depending on the embodiment as shown in FIG. 9.

In one example, 56% of the robot cleaner 10's battery is consumed to clean the living room, Then, after cleaning the bedroom #2 and the corridor, 30% of the battery remains. Thus, further cleaning is not possible. Thus, the living room is excluded from the candidate to be included in the combination to selected as the first region. Since the living room is not able to be cleaned, it may not be determined whether cleaning of a region (bedroom #1, a dressing room, and a dining room) having a fourth cleaning priority adjacent to the living room as the to-be-cleaned region with a third cleaning priority is possible.

Figure 11:
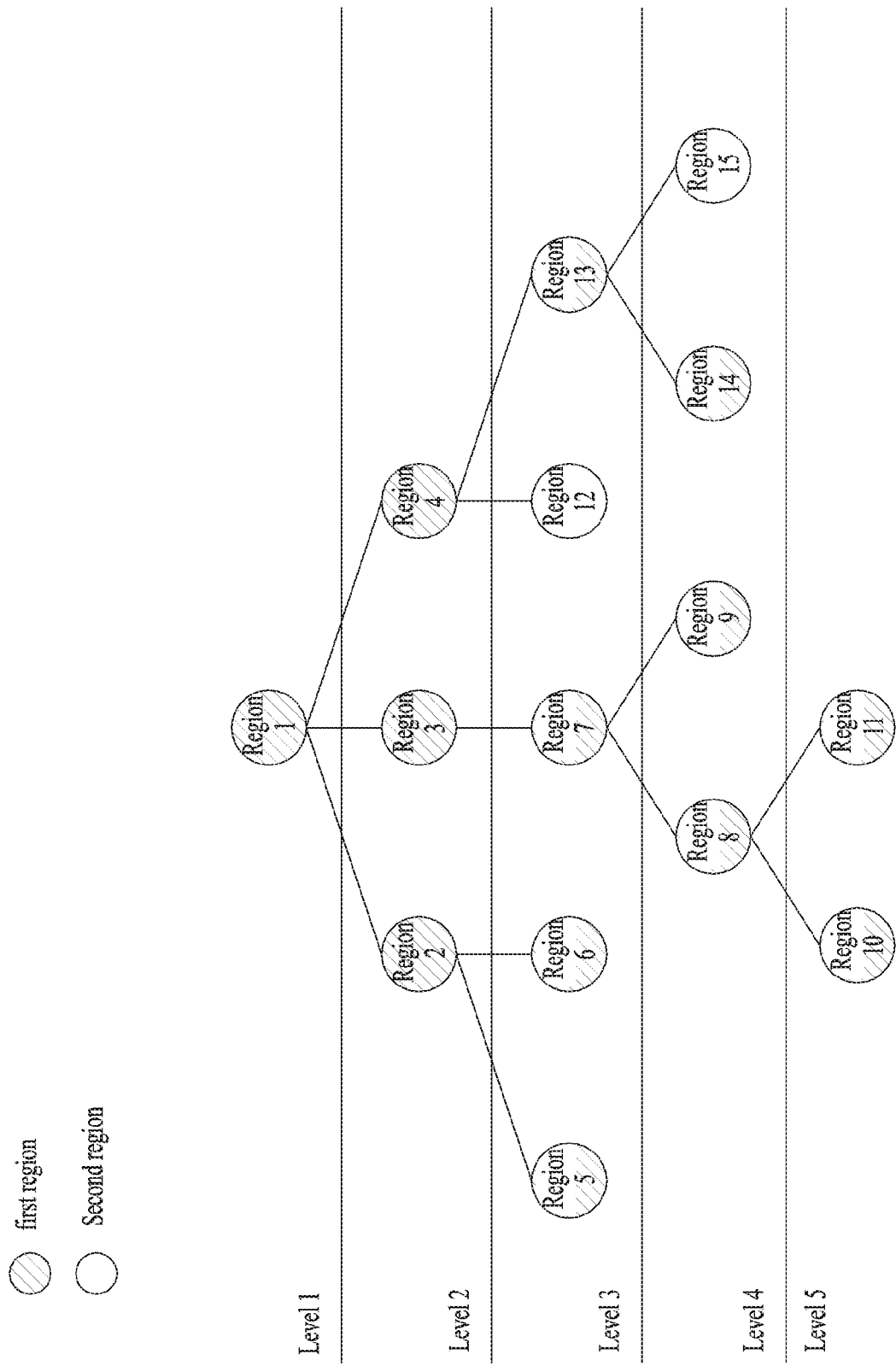
FIG. 11 shows a tree view of cleaning priority level between to-be-cleaned regions by a robot cleaner according to one embodiment of the present disclosure.

FIG. 11 illustrates the priority levels for cleaning the to-be-cleaned regions by a robot cleaner according to an embodiment of the present disclosure. When the first region has been selected, a single to-be-cleaned region which should be cleaned first should be selected among the to-be-cleaned region having the second priority level.

Referring to FIG. 11 as an example, the to be cleaned regions with the first cleaning priority may be defined as a region 1. The to-be-cleaned regions with a second cleaning priority may include region 2 to region 4. The to-be-cleaned regions with a third cleaning priority may include region 5 to region 7, region 12 and region 13. The to-be-cleaned regions with a fourth cleaning priority may include region 8, region 9, region 14, and region 15. The to-be-cleaned regions with the fifth cleaning priority may include region 10 and region 11.

Prior to the detailed descriptions thereof, "down-level regions" will be defined. As used herein, the term "down-level regions" corresponding to a specific to-be-cleaned region may include a line of the specific to-be-cleaned region and at least one to-be-cleaned region having a priority level lower than that of the specific to-be-cleaned region and directly and indirectly adjacent to the specific to-be-cleaned region.

For example, the down-level regions corresponding to region 2 may include region 2, region 5, and region 6. The down-level regions corresponding to region 3 may include regions 7 to 11. Similarly, the down-level regions corresponding to region 7 may include region 8 to region 11.

Descriptions will be made with reference to the example shown in FIG. 11. The robot cleaner 10 is capable of cleaning all regions except region 12 and region 15. As described above, cleaning prioritization indicates connections between the to-be-cleaned regions in a tree structure. Therefore, the robot moving to region 3 or region 4 after cleaning region 2 may result in an unnecessarily long movement path.

In order for the robot cleaner 10 to perform the cleaning efficiently, it may be important to follow a sequence of cleaning priorities of the to-be-cleaned regions. Specifically, if the robot cleaner 10 moves along the movement path unnecessarily when moving between the to-be-cleaned regions, this is disadvantageous in terms of energy efficiency because this may consume the battery capacity that should be used to clean the to-be-cleaned regions. Further, in terms of energy management, this may result in a longer cleaning time duration.

After the cleaning is completed for one to-be-cleaned region, the robot cleaner 10 may determine a cleaning priority of which the to-be-cleaned region to which the cleaner 10 moves. First, the robot cleaner 10 determines whether each of the down-level regions corresponding to the to-be-cleaned region to which the cleaner moves can be cleaned using the residual battery level. Then, the to-be-cleaned region determined not to be able to be cleaned among the down-level regions may be allocated to the lowest probability candidate.

For example, after cleaning region 1, the robot cleaner 10 may move to region 2, region 3 or region 4. In this connection, the robot cleaner 10 must determine which of the three regions should be first cleaned. At this time, the robot cleaner 10 determines whether the region 2, region 3 or region 4 can be cleaned using the current battery level.

Referring to FIG. 11, the down-level regions corresponding region 2 include region 2, region 5, and region 6 and can be cleaned using the current battery level. The down-level regions corresponding to region 3 include region 3 and region 7 to region 11 and can be cleaned using the current battery level. The down-level regions corresponding to region 4 include region 4 and region 12 to 15 but the region 12 and region 15 cannot be cleaned using the current battery level. Thus, the robot cleaner 10 may determine that cleaning of down-level regions corresponding to the region 4 is not possible. In this case, the down-level regions corresponding to region 4 may have the lowest cleaning priority.

However, when a plurality of to-be-cleaned regions are present, each having the down-level regions which can be cleaned using the current battery level, the robot cleaner 10 should determine one of the plurality of to-be-cleaned regions to which the robot moves. When a plurality of to-be-cleaned regions are present, each having the down-level regions which can be cleaned using the current battery level, the robot cleaner 10 may first clean down-level regions corresponding to a specific to-be-cleaned region among the plurality of to-be-cleaned regions, where the number of the to-be-cleaned regions between a region not adjacent to a region having a lower priority level than that thereof and a region where the charging station 200 is located (that is, the to-be-cleaned region with the first cleaning priority) is the smallest.

In other words, in the example shown in FIG. 11, cleaning of down-level regions corresponding to both region 2 and region 3 may be allowed. In this connection, the robot cleaner 10 may clean the region 2 first. Specifically, region 2 is connected to region 5 and region 6. Region 5 and region 6 are not connected to separate regions except region 2. Therefore, only region 2 exists between regions 5 and 6 and region 1.

Referring to the down-level regions corresponding to region 3, region 3 is connected to region 7, and region 7 is connected to region 8 and region 9, region 8 is connected to regions 10 and 11. Thus, a region not adjacent to a region having a lower priority level than that thereof may include region 10 and region 11. Then, there are three to-be-cleaned regions between each of region 10 and region 11 and region 1.

Therefore, the robot cleaner 10 first performs cleaning of the down-level regions corresponding to region 2 and then performs cleaning of the down-level regions corresponding to region 3. That is, the robot cleaner 10 allocates the lowest priority to the down-level regions including the to-be-cleaned region which cannot be cleaned. The robot cleaner 10 may first clean down-level regions corresponding to a specific to-be-cleaned region among the plurality of to-be-cleaned regions, each having the down-level regions which can be cleaned using the current battery level, where the number of the to-be-cleaned regions between a region not adjacent to a region having a lower priority level than that thereof and a region where the charging station 200 is located (that is, the to-be-cleaned region with the first cleaning priority) is the smallest.

Referring to the example shown in FIG. 11, the robot may clean region 1, region 2, region 5, and region 6 and move back to region 1 and then clean region 3, region 7, region 9, region 10, and region 11 and then return to region 1 and then clean region 4, region 13, and region 14. Then, after returning to the charging station 200, the robot cleaner is subjected to charging using the battery, and, then, clean the region 12 and region 15.

In one example, region 5 and region 6 may be cleaned in any order. However, after cleaning the region 2, the robot may first clean one of the region 5 and region 6 closer to the region 2. This may be preferable in terms of energy management.

When the cleaning is performed as described above, energy management may be efficiently performed. Further, the cleaning time duration may also be reduced by minimizing the unnecessary moment distance, which may result in efficient cleaning.

According to one embodiment of the present disclosure, the present disclosure is intended to provide a robot cleaner and a method for controlling the cleaner in which the robot cleaner may establish a cleaning plan at a start of cleaning and then may perform cleaning based on the plan.

Further, according to one embodiment of the present disclosure, the present disclosure is intended to provide a robot cleaner and a method for controlling the cleaner in which the robot cleaner may determine a cleaning region to be cleaned prior to additional charging and an cleaning region to be cleaned after additional charging in establishing the cleaning plan.

Further, according to one embodiment of the present disclosure, the present disclosure is intended to provide a robot cleaner and a method for controlling the cleaner in which the robot cleaner may reduce an unnecessary moving line and shorten a cleaning time duration. Furthermore, according to one embodiment of the present disclosure, the present disclosure is intended to provide a robot cleaner and a method for controlling the cleaner in which the robot cleaner may reduce energy consumption and efficiently manage energy.

According to one embodiment of the present disclosure, the present disclosure is intended to provide a robot cleaner and a method for controlling the cleaner in which the robot cleaner may establish a cleaning plan in which the robot cleaner considers a cleaning mode, a suctioning-power of the robot cleaner, and a number of obstacles in a to-be-cleaned region to divide a cleaning target area into a plurality of to-be-cleaned regions, and maps a battery amount consumed for each region to each region.

In particular, according to one embodiment of the present disclosure, the present disclosure is intended to provide a robot cleaner and a method for controlling the cleaner in which the robot cleaner may establish a cleaning plan in which the robot cleaner may calculate a required battery capacity for a first region that cannot be cleaned due to battery shortage via corresponding region analysis and may clean a second region that can be cleaned at a current battery capacity and then charge the required battery capacity and then clean the first sub region.

According to one embodiment of the present disclosure, the present disclosure is intended to provide a robot cleaner and a method for controlling the cleaner in which the robot cleaner may establish a cleaning plan in which the robot cleaners draws a drawing before starting cleaning to check a battery level required to complete cleaning of each region, and, then, after drawing, stores an amount of battery needed to complete cleaning of each region and converts the amount data into tree data based on proximity to a charging station location.

One aspect of the present disclosure proposes a method for controlling a robot cleaner, the method comprising: a preparatory step of dividing a cleaning target area input by an user into a plurality of to-be-cleaned regions and identifying a battery consumption required for cleaning each region; a determination step of determining whether the robot cleaner requires additional charging to clean the cleaning target area based on a current battery residual amount of the robot cleaner; upon determination that the additional charging is required, a selection step for selecting a first region, wherein the first region is defined as one combination selected from combinations of to-be-cleaned regions among the plurality of to-be-cleaned regions which are determined to be able to be cleaned using the current battery residual amount of the robot cleaner; and a first cleaning step of cleaning the first region.

In one implementation, the method further comprises: a charging step in which, after cleaning the first region, the robot cleaner returns to a charging station so that the battery is charged to an amount so as to clean a second region not yet cleaned among the plurality of to-be-cleaned regions; and a second cleaning step of cleaning the second region.

In one implementation, the first region is selected as a specific combination of regions, wherein the battery residual amount of the robot cleaner is exhausted at a maximum level in cleaning the specific combination. In one implementation, the first region is selected as a specific combination of regions based on a cleaning priority input by the user. In one implementation, the first region is selected as a specific combination of regions, wherein the specific combination among the combinations has a largest number of to-be-cleaned regions.

In one implementation, the first region is selected as a specific combination of regions, wherein the specific combination among the combinations has a largest total area of to-be-cleaned regions. In one implementation, a plurality of different cleaning priorities are allocated to the plurality of to-be-cleaned regions, wherein a to-be-cleaned region where a charging station is located has a first cleaning priority among the plurality of cleaning priorities, wherein when a (n+2)-th cleaning priority among the plurality of cleaning priorities is allocated to a specific to-be-cleaned region, wherein a number of to-be-cleaned regions between the to-be-cleaned region where the charging station and the specific to-be-cleaned region is n, wherein n=0 or a positive integer.

In one implementation, at least one to-be-cleaned region adjacent to a to-be-cleaned region having a (n+3)-th cleaning priority is present among to-be-cleaned regions having a (n+2)-th cleaning priority, wherein only upon determination that the at least one to-be-cleaned region is able to be cleaned using the current battery residual amount of the robot cleaner, the method proceeds to determine whether the to-be-cleaned region having the (n+3)-th cleaning priority is able to be cleaned using the current battery residual amount of the robot cleaner.

In one implementation, the plurality of to-be-cleaned regions are divided into a plurality of down-level regions groups, wherein a down-level regions group corresponding to one of the to-be-cleaned regions having the (n+2)-th cleaning priority includes said one and at least one to-be-cleaned region having the (n+3)-th cleaning priority adjacent to said one.

In one implementation, the robot cleaner first selects and cleans a single down-level regions group of the plurality of down-level regions groups, wherein the single down-level regions group is selected when the current battery residual amount of the robot cleaner is used to clean all regions of the single down-level region regions.

In one implementation, a number of the down-level region groups is at least two, wherein all of down-level region regions of each of the at least two groups are able to be cleaned using the current battery residual amount of the robot cleaner, wherein a specific group is first cleaned among the at least two groups, wherein a number of to-be-cleaned regions between a to-be-cleaned region of the specific group having a lowest cleaning priority and the to-be-cleaned region where the charging station is located is a smallest among the at least two groups.

In one implementation, a consumption amount of the battery for cleaning each of the plurality of to-be-cleaned regions is measured before cleaning begins. In one implementation, the consumption amount of the battery for cleaning each of the plurality of to-be-cleaned regions is measured based on a power consumption amount by a cleaning unit of the robot cleaner, wherein the power consumption amount varies based on a movement path bypassing obstacles sensed by an obstacle sensor and based on a floor material sensed by a floor sensor.

In one implementation, the battery consumption amounts measured between at least two cleaning modes and for each of the plurality of to-be-cleaned regions are different from each other and are input to a controller of the robot cleaner. In one implementation, the battery consumption amount measured for each of the plurality of to-be-cleaned regions varies based on a suctioning-power intensity of the robot cleaner.

In one implementation, before start of cleaning, the target area is divided into the plurality of to-be-cleaned regions based on a structure formed in the cleaning target area or based on an input from the user. In one implementation, when the current battery residual amount remains to clean all of the plurality of to-be-cleaned regions, the robot cleaner cleans all of the plurality of to-be-cleaned regions. In one implementation, at start of cleaning, the determination step and the selection step are performed.

When the method for controlling a robot cleaner according to an embodiment of the present disclosure is implemented, the energy of the robot cleaner may be used efficiently. Further, when establishing the cleaning plan, the robot cleaner may determine the to-be-cleaned region to be cleaned before the additional charging and the to-be-cleaned region to be cleaned after the additional charging. Thus, the cleaning time duration may be identified at the start of cleaning. Further, the cleaning time duration may be shortened by reducing the unnecessary moving distance. Further, energy management can be made more efficient while reducing the unnecessary moving distance.

Although the exemplary embodiments of the present disclosure have been described in detail above, those skilled in the art to which the present disclosure belongs will appreciate that various modifications may be made to the above embodiments without departing from the scope of the present disclosure. Therefore, the scope of the present disclosure should not be limited to the described embodiments but should be determined not only by the claims below, but also by the equivalents of those claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling a robot cleaner, the method comprising:
    dividing a target cleaning area into a plurality of to-be-cleaned regions and identifying respective battery consumptions for the robot cleaner to clean the to-be-cleaned regions;
    determining, based on the respective battery consumptions, whether a current battery residual charge amount of the robot cleaner is sufficient for the robot cleaner to clean all of the target cleaning area;
    when the current battery residual charge amount of the robot cleaner is not sufficient for the robot cleaner to clean the target cleaning area, selecting a first region corresponding to a first subset of to-be-cleaned regions that the robot cleaner is able to clean using the current battery residual amount;
    cleaning the first region by the robot cleaner using the current battery residual amount; and
    allocating a plurality of different cleaning priorities to the plurality of to-be-cleaned regions,
    wherein the cleaning priorities of the to-be-cleaned regions are determined based on proximities thereof to a charging station, wherein a first one of the to-be-cleaned regions where the charging station is located has a first cleaning priority among the plurality of cleaning priorities, wherein a (n+2)-th cleaning priority among the plurality of cleaning priorities is allocated to one or more second ones of to-be-cleaned regions, n being equal to 0 or a positive integer and corresponding to a number of intermediate ones of the to-be-cleaned regions located between the first to-be-cleaned region where the charging station is located and respective ones of the second to-be-cleaned regions, and wherein the plurality of to-be-cleaned regions are divided into a plurality of down-level regions groups, wherein a down-level regions group includes one of the second to-be-cleaned regions having the (n+2)-th cleaning priority and further includes at least one third to-be-cleaned region having a (n+3)-th cleaning priority adjacent to said one of the second to-be-cleaned regions.

2. The method of claim 1, wherein selecting the first region includes selecting a specific combination of the to-be-cleaned regions such that the battery residual amount of the robot cleaner would be exhausted at a maximum level when cleaning the specific combination.

3. The method of claim 1, wherein selecting the first region includes selecting a specific combination among combinations of the to-be-cleaned regions that can be cleaned using the current battery residual charge amount of the robot cleaner based on a cleaning priority input by a user.

4. The method of claim 1, wherein selecting the first region includes selecting a specific combination, among combinations of the to-be-cleaned regions that can be cleaned using the current battery residual charge amount of the robot cleaner, that includes a largest number of to-be-cleaned regions.

5. The method of claim 1, wherein selecting the first region includes selecting a specific combination, among combinations of the to-be-cleaned regions that can be cleaned using the current battery residual charge amount of the robot cleaner, that has a largest total area.

6. The method of claim 1, wherein the first region is selected from the to-be-cleaned regions based on the plurality of cleaning priorities.

7. The method of claim 6, wherein at least one of the second to-be-cleaned regions having the (n+2)-th cleaning priority is positioned adjacent to a third one of the to-be-cleaned regions, the third to-be-cleaned region having a (n+3)-th cleaning priority among the plurality of cleaning priorities, and wherein selecting the first region includes:

determining, when the robot cleaner can clean the at least one second to-be-cleaned region using the current battery residual amount, whether the third to-be-cleaned region having the (n+3)-th cleaning priority is able to be cleaned using the current battery residual amount of the robot cleaner such that the first region includes the third to-be-clean region only when the first region includes the at least one of the second to-be-cleaned regions.

8. The method of claim 1, wherein the robot cleaner first selects and cleans a single down-level regions group of the plurality of down-level regions groups, wherein the single down-level regions group is selected such that the current battery residual amount of the robot cleaner is used to clean all regions of the single down-level region regions.

9. The method of claim 8, wherein at least two of the down-level regions groups are defined, wherein the robot cleaner is able to clean the at least two down-level regions groups using the current battery residual amount, wherein a specific group is first cleaned among the at least two down-level regions groups, and wherein a number of ones of the to-be-cleaned regions between a particular one of to-be-cleaned regions of the specific group having a lowest cleaning priority and the first to-be-cleaned region where the charging station is located is a smallest among the at least two down-level regions groups.

10. The method of claim 1, wherein a battery consumption amount for cleaning each of the plurality of to-be-cleaned regions is determined before cleaning begins.

11. The method of claim 10, wherein the battery consumption amount for cleaning each of the plurality of to-be-cleaned regions is determined based on a power consumption amount by a cleaning head of the robot cleaner, wherein the power consumption amount varies based on a movement path in each of the to-be-cleaned regions associated with the robot cleaner bypassing obstacles sensed by an obstacle sensor and based on a floor material in each of the to-be-cleaned regions sensed by a floor sensor.

12. The method of claim 10, wherein the battery consumption amounts are differently measured for at least two cleaning modes, and the measured battery consumption amounts for the at least two cleaning modes are input to a controller of the robot cleaner.

13. The method of claim 10, wherein the battery consumption amount measured for each of the plurality of to-be-cleaned regions varies based on a suctioning-power intensity of the robot cleaner.

14. The method of claim 1, wherein the target area is divided into the plurality of to-be-cleaned regions based on at least one of attributes of a structure formed in the target area or an input from a user.

15. The method of claim 1, further comprising cleaning all of the plurality of to-be-cleaned regions when the current battery residual amount is sufficient to clean all of the plurality of to-be-cleaned regions.

16. The method of claim 1, wherein determining whether the current battery residual charge amount of the robot cleaner is sufficient for the robot cleaner to clean all of the target cleaning area and selecting the first region occur when the robot cleaner starts cleaning.

17. A robot cleaner comprising:
a cleaner head;
a drive motor that applies a force to move the robot cleaner;
a battery that supplies power to the robot cleaner; and
a controller to:
divide a target cleaning area into a plurality of to-be-cleaned regions;
identify respective battery consumptions for the robot cleaner to clean the to-be-cleaned regions;
select a first region corresponding to a first subset of to-be-cleaned regions that the robot cleaner can clean using only a current residual amount of the battery; and
control the drive motor and cleaner head to clean that the first region using the current residual amount of the battery,
wherein a plurality of different cleaning priorities are allocated to the plurality of to-be-cleaned regions,
wherein the cleaning priorities of the to-be-cleaned regions are determined based on proximities thereof to a charging station,
wherein a first one of the to-be-cleaned regions where the charging station is located has a first cleaning priority among the plurality of cleaning priorities, wherein a (n+2)-th cleaning priority among the plurality of cleaning priorities is allocated to one or more second ones of to-be-cleaned regions, n being equal to 0 or a positive integer and corresponding to a number of intermediate ones of the to-be-cleaned regions located between the first to-be-cleaned region where the charging station is located and respective ones of the second to-be-cleaned regions, and wherein the plurality of to-be-cleaned regions are divided into a plurality of down-level regions groups, wherein a down-level regions group includes one of the second to-be-cleaned regions having the (n+2)-th cleaning priority and further includes at least one third to-be-cleaned region having a (n+3)-th cleaning priority adjacent to said one of the second to-be-cleaned regions.

\* \* \* \* \*